April 5, 1949.  H. R. MOULTON ET AL  2,466,119
REFLECTION MODIFYING COATINGS AND ARTICLES SO
COATED AND METHOD OF MAKING THE SAME
Filed Nov. 6, 1944  2 Sheets-Sheet 1

INVENTOR.
HAROLD R. MOULTON
EDGAR D. TILLYER
BY
Louis L. Gagnon
ATTORNEY

April 5, 1949.  H. R. MOULTON ET AL  2,466,119
REFLECTION MODIFYING COATINGS AND ARTICLES SO
COATED AND METHOD OF MAKING THE SAME Filed Nov. 6, 1944  2 Sheets-Sheet 2

INVENTOR.
HAROLD R. MOULTON
EDGAR D. TILLYER
BY

ATTORNEY

Patented Apr. 5, 1949

2,466,119

UNITED STATES PATENT OFFICE 2,466,119

REFLECTION MODIFYING COATINGS AND ARTICLES SO COATED AND METHOD OF MAKING THE SAME

Harold R. Moulton and Edgar D. Tillyer, Southbridge, Mass., assignors to American Optical Company, Southbridge, Mass., a voluntary association of Massachusetts Application November 6, 1944, Serial No. 562,126

13 Claims. (Cl. 88—1)

This invention relates to reflection modifying coatings and methods of making and applying the same.

This application is a continuation in part of our copending application Serial No. 511,364, filed November 22, 1943, and now abandoned.

One of the principal objects of the invention is to provide reflection modifying coatings and methods of making and applying the same whereby the surface or surfaces of an article may be treated to reduce surface reflection or to increase surface reflection as desired with substantially no light absorption.

Another object of the invention is to provide novel and improved means and methods of modifying the reflection of light impinging upon the surface of an article whereby the reflection of light from said surface may be greatly increased or, greatly reduced beyond the capability of the original surfaces of the article.

Another object of the invention is to provide novel and improved means and methods of modifying the reflection of light impinging upon the surface of an article through the coating of said surface with a transparent coating or coatings.

Another object of the invention is to provide means and methods of the above character which are relatively durable and permanent.

Another object of the invention is to provide means for preventing the formation of mold or fungus growth on the coated article.

Another object of the invention is to provide new and novel means of producing light polarizing bodies.

Another object of the invention is to provide coatings by simple and efficient means and methods.

Another object is to provide an article with a transparent reflection modifying coating thereon whereby the reflective characteristics of the initial surface of said article are altered with the said coating capable of being removable with substantially no injury to the initial surface of the article.

Another object is to provide new and novel coating solutions and novel means and methods of applying the same.

Other objects and advantages of the invention will become apparent from the following description taken in conjunction with the adjoining claims. It is apparent that many changes may be made in the details of construction, arrangement of parts and steps of the method shown and described without departing from the spirit of the invention as expressed in the accompanying claims. We, therefore, do not wish to be limited to the exact details of construction, arrangement of parts and steps of the method shown and described as the preferred forms only have been given by way of illustration.

Referring more particularly to the drawings.

Figure 1:
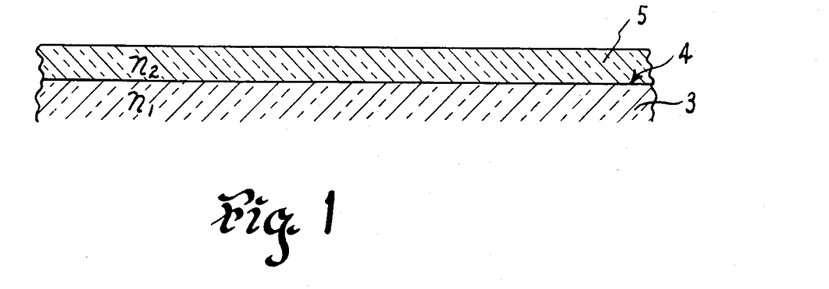
Fig. 1 is a diagrammatic representation of a transparent plate having on one surface thereof a transparent coating for increasing the reflectivity of said surface.

Referring to Fig. 1, the article 3 may be formed of any known desirable transparent medium such as glass, transparent plastics such as methyl methacrylate, cellulose esters, and cellulose ethers, formaldehyde-urea or formaldehyde-phenol condensation products, other resins, transparent minerals such as precious stones or simulated jewels and the like. The article may also be of an opaque nature.

The transparent medium constituting the article 3 may be prefabricated to any desired shape or contour such as lenses, prisms, mirrors, plates or the like either by the commonly known grinding or polishing methods or by molding, with the surfaces being of any desired textures.

On the surface 4 of the article 3 of Fig. 1 there is applied a coating 5 of an index of refraction considerably higher than the index of refraction of the body of the article itself, it being understood that the definite index of the body 3 is determined prior to placing the coating 5 thereon with the said material of said coating being controlled as to index of refraction so as to obtain the desired results. Such results in this particular instance being that of increasing the reflectivity of surface 4; as for example, to produce transparent mirrors or the like.

This result is obtained by applying to the surface 4 of said article a solution capable of depositing upon said article a coating 5 of high controlled index which is firmly adherent and smooth. This coating results from the simple drying out of the solvents from the solution leaving upon the surface 4 a coating of the nature described. The solution may be applied by dipping the article into the solution and withdrawing at a predetermined rate, by immersing the article into the solution and by pumping out or withdrawing the solution at a predetermined rate, by immersing the article to be coated, immediately withdrawing and placing in a holder and spinning or allowing to drain, or by rotating the article and during said rotation applying a desired amount of said solution to said article, continuing with the rotation until the solution has dried, the centrifugal force serving to spread the solution evenly over the article to produce a substantially uniform coating of proper thickness. If desired, a suitable quantity of the solution may be applied to the article while stationary, the article then being rotated to spread the solution and to bring about drying by the evaporation of solvents from the coating solution.

The thickness of the resultant coating is controlled by varying the concentration of the active material in the solution, by varying the rate of withdrawal of the article from the solution or the solution from the article, or by varying the speed of rotation of the article.

A solution which has produced favorable results is substantially as follows:

To 100 parts of 190 proof ethyl alcohol are added slowly and with constant stirring 10 parts of titanium tetra-chloride. The reaction is rather violent and copious white fumes are evolved. Consequently, the addition should be made in a well ventilated place or preferably in a chemical hood. There results a pale yellowish colored liquid which no longer fumes but which is rather acid and which should be stored in glass. This is a master solution which upon suitable dilution will produce the results desired. In order to obtain surfaces of high reflectivity upon materials of the usual range of indices of refraction, namely from 1.45 to 1.70, this solution is diluted with an equal part of the alcohol. This diluted solution has been designated as Solution #155 and is a solution used for obtaining high reflectivity. Application of this solution to the article in the manner above described followed by baking at from 50 to 200° centigrade or more (to accelerate the drying) has produced surfaces on 1.523 index glass having reflections of the order of 15% where the reflectivity for untreated polished surfaces of this same glass are substantially 4%. As above stated, such high reflecting surfaces, unlike those produced by metal mirrors, have a transmission for white light equal to 100% minus the per cent reflectivity of the coated surface substantially no light being lost by absorption by the coating. This produces an excellent transparent partially reflecting mirror.

Replacement of the titanium tetra-chloride by tin tetra-chloride results in a similar increase in reflection although in the case of the tin tetra-chloride, the increase is not as great because of the lower index of refraction of the coating produced by said tin tetra-chloride. Other chlorides or transparent, firmly adherent smooth high index coatings by the drying of a solution may be used but it has been found that the most effective coatings result from the use of titanium tetra-chloride as the base material. The use of 10 parts of titanium tetra-chloride to 100 parts of alcohol has been selected as convenient for a master stock solution. The addition of large quantities of the titanium tetra-chloride results in the evolution of much more heat and in any case the solution must be diluted for use through the subsequent use of alcohol or other solvents such as butyl alcohol, iso-propyl alcohol and in general water miscible organic solvents or vehicles. Surface active agents, effective in acid organic solutions such as di octyl sulfoccinate, or similar materials, may be added to facilitate spreading. The selection of the actual solvents or solvent mixtures is based upon evaporation rates, spreading action and the like. The concentration of the solution specified namely an alcoholic solution to which has been added an equal part of the stock solution, namely the alcohol and titanium tetra-chloride mixture set forth above, when applied to a two inch diameter disk and whirled at approximately 1000 R. P. M. gives a coating of high reflectivity when applied to bases having an index of refraction of 1.5 to 1.7. This solution has quite uniform reflectivity throughout the visible spectrum although it may appear slightly yellowish to the naked eye. Reduction of the thickness by the slower withdrawal of the solution or by increased dilution renders the reflectivity of the coating more uniform throughout the visible spectrum although the total reflectivity in this case may be slightly less. Surfaces of the nature described resulting from the above described solutions are extremely permanent and resistant to abrasion, weathering, and chemicals and are far superior in these respects to thin vacuum or chemically applied metallic coatings which have heretofore been used for these purposes.

A valuable use for such coatings is their application to the reflecting surfaces of prisms whereby the use of certain unstable heavy optical glasses may be avoided. It is customary in order to obtain as large a field as possible with a limited size prism to use a barium crown glass having an index of refraction of 1.57. This glass is heavy, unstable chemically, and costly. By the application of such a high reflecting surface to similar prisms made of borosilicate glass or ordinary spectacle crown, the desirable increased reflection characteristics of these high index glasses may be obtained. For example, let us assume it is desired to produce an article having increased surface reflection such as set forth above. While it is not possible to measure directly the index of refraction of an extremely thin coating of the nature described, from the increased reflection attained a value have been obtained by computation which clearly indicates that the coating is of an extremely high index of refraction and greatly above that of the ordinary glasses desired to be used in forming such articles. It is believed by applicants that the index of refraction of the coating is in the neighborhood of 2.5. It is understood, of course, that the reflectivity may be varied over a wide range from the maximum to that inherent in the article itself by varying the thickness, as will result from varying the concentration of the solution, the speed of rotation, or by other means mentioned above. For example, the reflectivity of a single surface may be increased by minute gradations from the natural reflectivity of substantially 4% to approximately 15%.

The index of refraction of the article 3 will be hereinafter referred to as $n_1$ and the index of refraction of the coating 4 will be hereinafter referred to as $n_2$.

Figure 2:
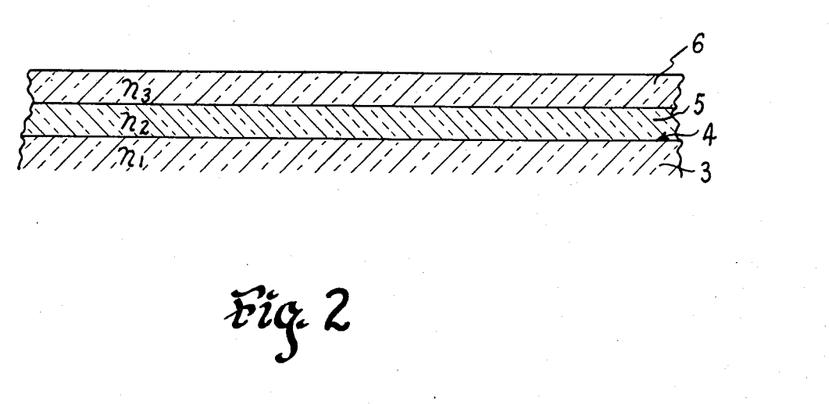
Fig. 2 is a view generally similar to Fig. 1 showing a second coating applied over the first one for reducing reflection of the article.

Having such a high index layer applied to a surface of an article, it now becomes possible as shown in Fig. 2 to apply a thin layer or coating 6 having a relatively low index of refraction $n_3$ which when applied in the proper thickness will greatly reduce the reflectivity of the composite structure of Fig. 1 to a value considerably less than that of the original surface 4.

For example, a solution is prepared by mixing 45 parts ethyl alcohol, 5 parts tetra-ethyl-ortho-silicate, 45 parts ethyl acetate, and 5 parts concentrated hydrochloric acid in the order named. The solution resulting is well stirred and allowed to stand for approximately seven days. This aging period has been found very desirable as the most practical results have been obtained by following this procedure although shorter or longer aging periods may be used depending upon the temperature of storage. This solution is comparatively stable and has a life of several months. This solution will be designated solution #50. The actual solvents, namely ethyl acetate and alcohol have proved most practical but all or part of the acetate may be replaced by alcohol. The alcohol or the acetate may be replaced in part by other solvents such as butyl alcohol, iso-propyl alcohol, ethylene glycol monoethyl ether and the like, in order to obtain desirable evaporation rates, spreading and the like. All of the above solvents are volatile organic water miscible solvents. If desired, the proportion of ethyl silicate may be increased at the expense of the solvents in order to obtain a more concentrated stock solution. For example, a solution embodying up to 10% tetra-ethyl-ortho-silicate has been found useful. Greater or less proportions of the acid may be desirable but some acid is necessary. While hydrochloric acid has been found more suitable, other volatile, strong acids such as hydrobromic acid or the like may be used which do not attack the material of the article. Hydrofluoric acid would not be desirable because of its objectionable effect on glass and on the silica layer to be produced.

Through the application of the solution set forth above for producing the layer 5, it is believed that the resultant layer 5 consists essentially of titanium dioxide of coherent and strongly adherent form. The application of the solution which forms the layer 6 results in a layer of silicon dioxide in strongly bonded relation with the layer 5, with said layer 5 having a relatively high index of refraction as compared with the index of refraction of the material of the article, and the index of the refraction of the coating 6 being lower than that of the coating 5 and generally lower than the index of the refraction of the article itself.

Application of this solution to the surface of the article to which has been previously applied the coating 5, by means of dipping, spinning, whirling, etc. such as set forth above in connection with the application of said coating 5, results in the production of a second coating 6 in superimposed relationship to the coating 5 whereby the two coatings working in conjunction reduce the reflectivity greatly as compared to the uncoated article.

The solution #50 may be modified by dilution in order to control the thickness, or the rate of withdrawal of the article from the solution or the solution from the article, or the speed of rotation if the article be spun or rotated give controls of the thickness of the layer 6. The thickness is selected by observation, the most effective coatings being those whose reflected light at normal incidence is purple to blue-purple with the blue-purple being somewhat more efficient.

It has been found desirable to bake this second coating also to temperatures which may be as low as 50° C. or if the article is capable of withstanding more elevated temperatures 100° C. to 200° C. Other more elevated temperatures may prove desirable in special cases with the lower temperatures being preferable for transparent media which are susceptible to heat injury at the higher temperature.

It has been found that such heat treatment tends to modify the color of the reflected light, in general, shifting the apparent color of the coating due to reflected light toward the red. It is desirable therefore to select a bluish color before heat treatment so that after heat treatment the resultant finished coated article will have a reflectance which is blue-purple. For special uses where the actual color of the reflected light which is finally selected depends upon the use to which the article is to be put and for certain specified uses it may be preferred to have the final article reflect in the red-purple rather than in the blue-purple but in very wide color ranges it may be controlled as described above, namely by varying the thickness of the coating 6.

The above is for ordinary visual purposes After baking as above and cooling, a low index coating, such as produced by solution #50 alone was applied to each sample. After running a series of experiments as shown in Tables I through III, white light reflection measurements were made and expressed in percent reflectivity per surface as shown in said Tables I through III. From such measurements, it is possible to select the most desirable mixture for producing a coating 5 so that minimum reflectances are obtained for bodies or articles of different indices of refraction without requiring a special mixture for each index.

where maximum reflection reduction is required at the point of maximum visual sensitivity in the green. For some purposes the maximum reflection reduction may be required in the ultra-violet or the infra-red; for these purposes appropriate changes must be made in the thickness of the coatings.

The above solutions are most effective on glass or articles of relatively low index such as ordinary crown glass having an index of refraction of 1.52.

The use of solution #155 and solution #50 as described above while effective on glass of index 1.52 is not as effective on glasses of higher index except when the thickness of the coating 5 is controlled with great accuracy.

Unlike previous methods of producing transparent coatings of these types, it is possible by suitable admixtures of solution #155 and solution #50 to obtain a smooth, uniformly graded series of indices of refraction between the two values normally given by each of these solutions. It has thus been found possible to obtain substantially uniform reflection reduction for glasses of different indices by modifying the index of refraction of the layer 5.

Solution #155 and solution #50 were mixed in varying proportions and applied as a first coating to a series of lenses having indices of 1.52, 1.62, 1.66, and 1.70 as shown in the following Tables I, II, and III.

Table I

| | First Coat or Coating 5 | | Second Coat or Coating 6 | | | | Glass Index | Per Cent Reflection per Surface |
|---|---|---|---|---|---|---|---|---|
| | Parts Weight 190 Proof Ethyl Alcohol | Parts Weight Titanium Tetra-Chloride | Parts Weight 190 Proof Ethyl Alcohol | Parts Weight Ethyl Silicate | Parts Weight Ethyl Acetate | Parts Weight Hydrochloric Acid | | |
| Experiment 155F | 100 | 5.0 | 45 | 5 | 45 | 5 | 1.52<br>1.62<br>1.66<br>1.70 | 2.2<br>1.75<br>1.1<br>1.1 |
| Experiment 155G | 100 | 3.5 | 45 | 5 | 45 | 5 | 1.52<br>1.62<br>1.66<br>1.70 | 1.45<br>1.50<br>1.0<br>1.25 |
| Experiment 155H | 100 | 2.5 | 45 | 5 | 45 | 5 | 1.52<br>1.62<br>1.66<br>1.70 | 1.8<br>1.1<br>0.8<br>0.7 |
| Experiment 155J | 100 | 1.75 | 45 | 5 | 45 | 5 | 1.52<br>1.62<br>1.66<br>1.70 | 1.3<br>1.0<br>0.8<br>0.7 |
| Experiment 155K | 100 | 1.0 | 45 | 5 | 45 | 5 | 1.52<br>1.62<br>1.66<br>1.70 | 1.7<br>1.2<br>1.0<br>1.0 |
| Experiment 155L | 100 | 10. | Preferably a stock solution to be diluted | | | | | |

Table II

| | Materials Employed for Solution for First Coat or Coating 5, Parts by Weight | | | | | Materials Employed for Solution for Second Coat or Coating 6, Parts by Weight | | | | Glass Index | Per Cent Reflection per Surface |
|---|---|---|---|---|---|---|---|---|---|---|---|
| | 190 Proof Ethyl Alcohol | Titanium Tetra-Chloride | Ethyl Acetate | Tetra-Ethyl-Ortho-Silicate | Hydro-Chloric Acid | 190 Proof Ethyl Alcohol | Tetra-Ethyl-Ortho-Silicate | Ethyl Acetate | Hydro-Chloric Acid | | |
| Experiment 157A | 85. | 4.0 | 9.0 | 1.0 | 1.0 | 45 | 5 | 45 | 5 | 1.52<br>1.62<br>1.66<br>1.70 | 2.2<br>1.7<br>1.2<br>1.1 |
| Experiment 157B | 80. | 3.5 | 13.5 | 1.5 | 1.5 | 45 | 5 | 45 | 5 | 1.52<br>1.62<br>1.66<br>1.70 | 2.25<br>1.6<br>1.3<br>1.0 |
| Experiment 157C | 75. | 3.0 | 18.0 | 2.0 | 2.0 | 45 | 5 | 45 | 5 | 1.52<br>1.62<br>1.66<br>1.70 | 1.1<br>1.2<br>0.8<br>0.75 |
| Experiment 157D | 70.0 | 2.5 | 22.5 | 2.5 | 2.5 | 45 | 5 | 45 | 5 | 1.52<br>1.62<br>1.66<br>1.70 | 1.15<br>1.0<br>0.9<br>0.9 |
| Experiment 157E | 65.0 | 2.0 | 27.0 | 3.0 | 3.0 | 45 | 5 | 45 | 5 | 1.52<br>1.62<br>1.66<br>1.70 | 1.0<br>1.05<br>1.15<br>1.1 |
| Experiment 157F | 60.0 | 1.5 | 31.5 | 3.5 | 3.5 | 45 | 5 | 45 | 5 | 1.52<br>1.62<br>1.66<br>1.70 | 1.4<br>1.4<br>1.6<br>1.7 |
| Experiment 157G | 55.0 | 1.0 | 36.0 | 4.0 | 4.0 | 45 | 5 | 45 | 5 | 1.52<br>1.62<br>1.66<br>1.70 | 1.8<br>2.1<br>2.5<br>2.4 |

Table III

| | Solution for First Coat or Layer 5, Parts by Weight | | | | | Solution for Second Coat or Layer 6, Parts by Weight | | | | Glass Index | Per Cent Reflection per Surface |
|---|---|---|---|---|---|---|---|---|---|---|---|
| | 190 Proof Ethyl Alcohol | Titanium Tetra-Chloride | Ethyl Acetate | Tetra-Ethyl-Ortho-Silicate | Hydro-Chloric Acid | 190 Proof Ethyl Alcohol | Tetra-Ethyl-Ortho-Silicate | Ethyl Acetate | Hydro-Chloric Acid | | |
| Experiment 156A | 65. | 2.0 | 27. | 3 | 3 | 45 | 5 | 45 | 5 | 1.52<br>1.62<br>1.66<br>1.70 | 1.0<br>1.1<br>1.2<br>1.2 |
| Experiment 156B | 79. | 1.2 | 16.2 | 1.8 | 1.8 | 45 | 5 | 45 | 5 | 1.52<br>1.62<br>1.66<br>1.70 | 1.6<br>1.4<br>1.6<br>1.7 |
| Experiment 156C | 82.5 | 1.0 | 13.5 | 1.5 | 1.5 | 45 | 5 | 45 | 5 | 1.52<br>1.62<br>1.66<br>1.70 | 1.75<br>1.45<br>1.4<br>1.4 |
| Experiment 156D | 87.5 | 0.7 | 9.6 | 1.1 | 1.1 | 45 | 5 | 45 | 5 | 1.52<br>1.62<br>1.66<br>1.70 | 2.0<br>1.6<br>1.4<br>1.9 |
| Experiment 156E | 91.25 | 0.5 | 6.75 | 0.75 | 0.75 | 45 | 5 | 45 | 5 | 1.52<br>1.62<br>1.66<br>1.70 | 2.25<br>1.6<br>1.45<br>1.3 |

By means of a series of mixtures as shown in the Tables I through III, the most satisfactory value for coating 5 may be obtained.

Such compositions would correspond to solutions 157C and 157D as shown in Table II. Of course, intermediate compositions containing lesser proportions of high index material may be used.

From the above, it will be seen that the most practical combination of coatings 5 and 6 may be obtained depending upon the results desired. It is to be understood that the maximum of reduction of reflection is not desired in all instances and that the above tables give practical, usable results.

For obtaining increased or maximum reflectivity for glasses of given indices of refraction a procedure as follows may be used.

Solutions as used for the first coating 5 shown in Tables I, II and III may be selected, in general the higher reflectivity being obtained by the solutions having the higher content of titanium tetrachloride which in effect produce coatings 5 having the highest index of refraction which when combined with the article 3 will increase greatly the reflectivity thereof beyond that of the inherent surface 4 of the article itself, it being understood that the results desired may be obtained by the cut and try method following the same general methods used in measuring the reflectivity or reflection reduction such as given above. Although only titanium tetra-chloride is given in the above tables, it is to be understood that similar tables may be worked out for the tin tetra-chloride which in some instances may be preferable as a substitute for the titanium tetrachloride. It is also understood that other titanium compounds similarly decomposable such as titanium bromide or titanium iodide may be used in which case the same solvents in substantially the same proportions except as modified by the different atomic weights of the other halogens, would be used. Of course, other titanium compounds which are decomposable under the conditions set forth above may be used but titanium tetra-chloride has proved the best of those employed.

It is also to be understood that while tetra-ethyl-ortho-silicate has been set forth as the effective material for producing the low index coating, other decomposable silicon compounds such as other alkyl silicates, silicols, silicanes and substituted silanes may also be used and will be in substantially the same proportions depending upon the silicon present in said compound. These other materials would simply replace the tetra-ethyl-ortho-silicate, the other solvents and/or mixtures of solvents being substantially the same.

The coatings set forth above are employed in coating ophthalmic lenses, the optical elements of optical systems, transparent bodies, prisms, glass or plastic plates such as used for windows, cover plates for instruments or the like, dials etc. or for opaque non-metallic articles such as photographs, pictures, maps, charts, etc. where reflection reduction is desired in order to increase detail and contrast, or to remove undesired reflections. Metallic objects which have had applied to them by known means black or colored coatings such as for example black nickel plate or the black coating on iron and steel resulting from their treatment with phosphate or oxalate solutions or dyed aluminum oxide as produced by anodically treated aluminum in sulphuric acid solution and subsequently treating in a dye bath, all of which coatings tend to be dark but quite highly reflective and glossy, may have this gloss and reflectivity reduced by the means disclosed.

Just as the index of refraction of the layer 5 was modified by admixture of the solution #155 and the solution #50 before application to form such a coating 5 the solution used in forming the coating 6 can also be modified as set forth above in said tables so to raise its index to a value approximating that of the index of refraction of the article 3. It is sometimes desirable to do this, as in such cases the variation of reflectivity with wavelength or color of the light is less.

Table I shows the effect upon the amount of white light reflection of variations in the thickness of the high index layer 5 using a constant thickness and constant index of refraction for layer 6.

The first column of the table gives the experiment number, the second column indicates the parts by weight of alcohol. It will be observed from the table that the concentration of the high index coating producing material, namely titanium tetra-chloride used in making the solution has been successively decreased and the concentration in the solution consequently decreased as this is the simplest way of varying by readily controllable means the thickness of the coating without varying the method of application. In all cases, these coatings were applied to two-inch diameter flat disks of glass of the indices described by spinning at approximately 1000 R. P. M., and applying the solution while the sample is in motion and causing it to dry.

Figures 3, 4:
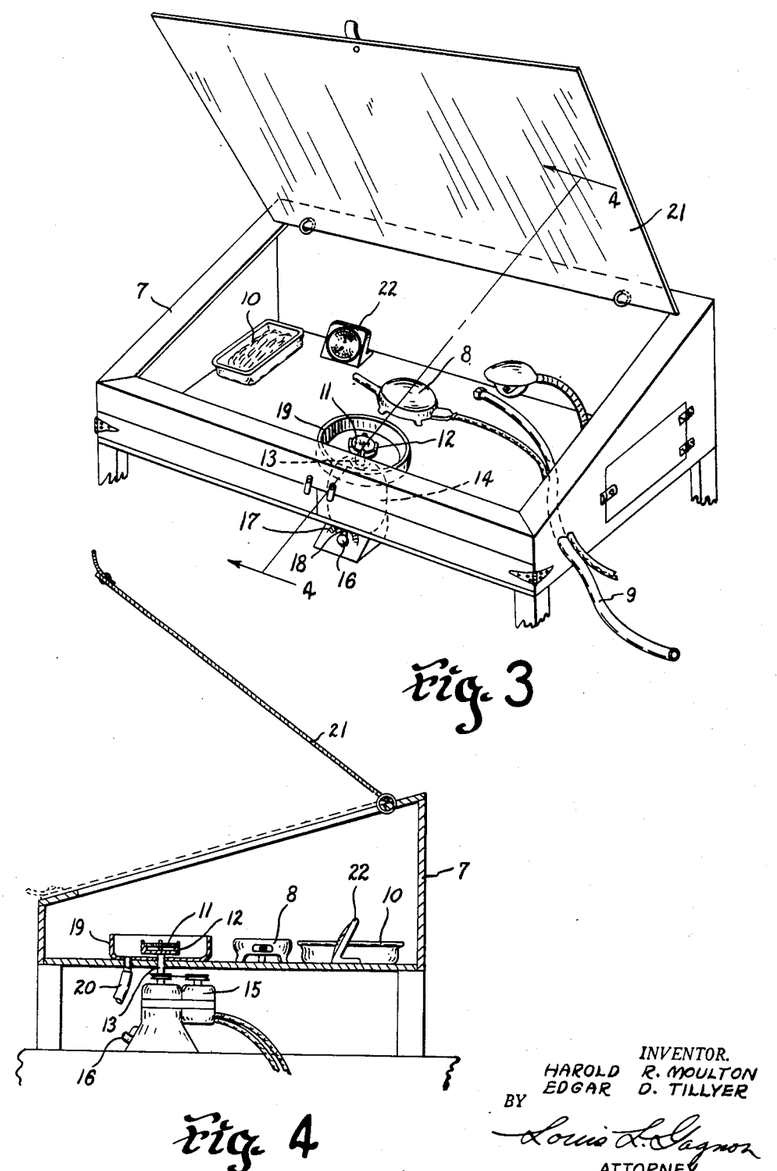
Fig. 3 is a perspective view diagrammatically illustrating one form of apparatus for applying the coatings of the invention.
Fig. 4 is a sectional view taken as on line 4—4 of Fig. 3.

In order to control the temperature and humidity conditions, an enclosure 7, as shown in Figs. 3 and 4 may be used which may be heated by a suitable heating unit 8 or which may be cooled by cold air directed through a pipe line 9 internally of said enclosure. The air directed internally of the enclosure is preferably clean, dry air and is of such an amount that a slight positive pressure exists in the enclosure. If desired, drying agents 10 may also be exposed in the enclosure, such as calcium chloride, silica jell or other moisture absorbing materials. The article 11 to be coated is supported in a suitable holder 12 mounted on a spindle 13 rotated by an electric motor or the like 14. The spindle 13 is driven by the motor through a suitable speed reduction arrangement 15. The speed of rotation of the motor is controlled as by a rheostat or the like 16 and the speed of rotation may be determined through the provision of a suitable scale 17 and indicator arrangement 18 associated with the rheostat control. Other known means may be provided for accomplishing the same result. With this arrangement, the speed of rotation of the article 11 to be coated may be positively controlled. The coating solution is preferably deposited on the upper or outer exposed surface of the article 11 while being rotated and a suitable shield 19 is placed about the article so as to prevent spattering. The shield 19 is in the form of a pan having a suitable drain 20. The enclosure 7 is preferably provided with a transparent cover 21 through which the article or work being treated may be observed during the rotation thereof after the solution for producing the coating has been applied thereto. This also enables the controlling of the internal atmospheric pressure. The enclosure is also provided with a suitable thermometer and hygrometer 22.

It is to be understood that the above is only set forth by way of illustration of how the above mentioned conditions may be controlled during the forming of the coating by the rotation method and it is to be understood that many other devices of similar arrangements may be used.

After application of the first coating, the samples were placed in an oven and dried at somewhat elevated temperatures of 50° to 100° C. After cooling, the samples were then coated with the solution for producing coating 6 following the same general procedure. In applying coating 6, it is especially desirable that the atmosphere surrounding the work, be dry during the application solution. Humidity values above 50% are objectionable and best results have been obtained when the relative humidity was 15% or less. Under some conditions, slight elevation of temperature in the enclosure is also desirable up to perhaps 30 or 40° C. These values and conditions are arrived at according to the particular nature of the coating desired and according to the article being coated and may be readily attained by trial and error. If the moisture is too high the coatings tend to be slightly diffusing.

Having produced such coatings through the range indicated in Table II on glasses of indices of refraction of 1.52, 1.62, 1.66, and 1.70 and having measured the white light reflection per surface at normal incidence for these coated samples experiments, it then becomes possible to select a solution for producing the first coating 5 which will give the best general results for all these indices. For example, in Table I, it will be observed that the most effective reflection reduction or that the lowest reflection values were obtained under the condition of experiment 155J.

Experiment 155L discloses the formation of a more concentrated stock solution to be diluted as desired to form solutions for producing first coatings 5.

Although we have given experiments as to glasses of the above indices of refraction, it is to be understood that other intermediate indices of refraction might be used. The reflection values found would be intermediate those given in the table.

Table II shows the effect upon white light reflection of the coated article of variations in the index of the coating 5 while the thickness is maintained substantially constant. The same conditions of application of coating 5 and coating 6 as set forth above in connection with Table I were used. The effective index of refraction of layer 5 was varied by simultaneously reducing the content of high index material (titanium tetrachloride) and increasing the content of low index material (tetraethyl-ortho-silicate). In this way a series of coating solutions for producing coating 5 were obtained. Coating 5 in experiment 157A is of a higher index than, for example, experiment 157G etc.

From Table II it will be observed that experiment 157C is particularly effective when applied as the first coating 5 and when subsequently coated with the coating 6 in producing low reflection coatings on glasses of the indices of refraction given. Experiment 157A is less effective as is also experiment 157G and it thus becomes possible to select the most desirable solution for producing coating 5 for use in combination with the solution for the coating 6.

Table III shows the effect upon white light reflection of the coated article of decreasing the thickness of coatings 5 of the type given in Table II. The actual composition of the solution used in experiment 156A corresponds to the solution used in experiment 157E shown in Table II and this solution was modified by increasing the proportion of solvents (in this case, alcohol) whereby thinner coatings were produced. The table shows that thinning coatings of this nature does not improve the reflection reduction characteristics as does thinning coatings of the type described in Table I. In this particular material it will be observed that the results shown in the Table III indicate that dilution is not as desirable as the dilution indicated in Table I.

It is to be understood that the above is given only by way of example as to how the proper dilution and resultant thickness may be obtained without difficult calculations and involved manipulations, it being only necessary to follow the above given method for all solutions.

The following Table IV indicates the compositions which have produced practical results for coating 6 and teaches how to vary the composition of such solutions for various sizes and shapes of articles and different methods of applications.

*Table IV*

| | Materials employed for solutions for second coat or coatings 6 | | | | | | | | | |
|---|---|---|---|---|---|---|---|---|---|---|
| | 1 | | | | 2 | | | 3 | | |
| | 190 proof ethyl alcohol | Tetraethyl-orthosilicate | Ethyl acetate | Hydrochloric acid | 190 proof ethyl alcohol | Tetraethyl-orthosilicate | Hydrochloric acid | Volatile water miscible organic vehicle | Tetraethyl-orthosilicate | Hydrochloric acid |
| Experiment 50A | 45 | 5.0 | 45 | 5 | 90 | 5 | 5 | 90 | 5 | .1-5 |
| Experiment 50B | 46 | 4.0 | 46 | 4 | 92 | 4 | 4 | 92 | 4 | .1-4 |
| Experiment 50C | 47 | 3.0 | 47 | 3 | 94 | 3 | 3 | 94 | 3 | .1-3 |
| Experiment 50D | 48 | 2.0 | 48 | 2 | 96 | 2 | 2 | 96 | 2 | .1-2 |
| Experiment 50E | 49 | 1.0 | 49 | 1 | 98 | 1. | 1. | 98 | 1.0 | .1-1.0 |
| Experiment 50F | 49.9 | 0.1 | 49.9 | 0.1 | 99.8 | 0.1 | 0.1 | 99.8 | 0.1 | .01-0.1 |
| Experiment 50G | 40 | 10.0 | 40 | 10. | 80 | 10.0 | 10.0 | 80 | 10.0 | .1-10. |
| Experiment 50H | 44 | 6 | 44 | 6 | 88 | 6. | 6. | 88 | 6. | .1-6 |

For example, the solution of choice in the above tabulated experiments was that shown as experiment 50A₁. Under certain conditions where ethyl acetate is undesirable, solution 50A₂ may be used in which case alcohol is the only organic solvent present. For example, in working with materials which are attacked by ethyl acetate. The solution shown in 50A₃ shows that the solvents are not necessarily restricted to alcohol or ethyl acetate, other water miscible organic solvents (termed organic vehicles) which do not react adversely with tetra-ethyl-ortho-silicate or hydrochloric acid, as is commonly known in the art, may be used, such as ethylene glycol monoethyl ether, isopropyl alcohol, methyl alcohol, acetone, butyl alcohol or mixtures of any or all of these materials or other water miscible volatile organic compounds of the nature described. The use of any one of these solvents does not significantly change the proportions set forth in the table.

Experiments $50B_1$, $C_1$, $D_1$, $E_1$, $F_1$ shows solutions having a decreasing content of the active materials and their effect as to the reflection when applied to an article having a layer or coating 5 according to the above tables is substantially in proportion to the active ingredients. That is, a solution such as solution $50E_1$ containing 1% tetra-ethyl-ortho-silicate would have to be applied a number of times to produce the same effect as the solution shown in experiment $50A_1$. Although for large areas the lower content of active material (tetra-ethyl-ortho-silicate) may be desirable, it will also be noted as shown in the series of experiments $50A_3$, $50B_3$, etc. that the actual concentration of hydrochloric acid or other acid may be varied, that it need not necessarily be equal in quantity to the tetra-ethyl-ortho-silicate. In general, however, it is not desirable to use a higher acid content than the content of tetra-ethyl-ortho-silicate because the solution may become less stable.

By the application of a multiplicity of alternating layers of high and low index, it is possible to obtain highly selective efficient filters whereby the transmission of light for a particular wavelength is greater than that for adjacent wavelengths which are reflected to a greater degree than the wavelength transmitted. The color of the light transmitted by such a composite structure can be varied by varying the relative thickness of the various layers and by controlling the number of layers applied. In each instance, however, the coatings will be applied alternately.

It has been found that coating 5 when applied to materials which are normally readily scratched greatly increases their resistance to marring or wear by abrasion. In addition, the chemical inertness of the titanium dioxide layer of the coating 5 also serves to protect the underlying article from chemical attack and from weathering.

Either or both of the coatings 5 and 6 may serve as the carrier for a coloring agent such as spirit or oil soluble dyestuffs or other coloring agents whereby in addition to reflection reduction or reflection increase, desirable tinctorial effects may be produced. The outer surface 6 consists of silicon dioxide which is highly resistant to chemical attack withstanding acids in general with the exception of hydrofluoric acid to a high degree. It may, however, be removed if desired by means of strongly alkaline solutions which in general leave the coating 5 undamaged thereby enabling the reclaiming of defective coated articles without the necessity for repeating the initial coating operation. Both coatings are adherent and abrasion resistant with the outer coating 6 being highly resistant to ordinary cleaning operations thereby facilitating the handling and assembly of articles so coated and rendering said articles relatively durable.

By dissolving in the solutions used for producing any or all of the coatings a fungicide such as halogenated phenol, a mercury compound, a copper compound, or other known fungicide soluble in the solvents used for said coating solutions, the resultant coatings become highly effective in preventing fungus growth from occurring.

These fungicides may be used in quantities varying from a few hundredths of a per cent concentration in the solution to quantities sufficient to represent approximately 10% or more of the resultant coating. In instances when it is desired to form an article having highly reflecting characteristics, the first coating, N2, adjacent to the surface of the article, N1, as shown in Fig. 2, is made of a relatively low index of refraction as compared to the article and to the next coating, N3. In general, the coating, N3, will be made of as high an index as possible for maximum efficiency, but it is understood that for certain special purposes such as will be hereafter apparent that the index of refraction of the coating N3 may be varied.

By repeating this process having alternating low and high index coatings of the proper thickness the amount of reflectance increases greatly with the number of coats used. In general it is desirable to have the outside coat of high index. Thus, it is possible to, by building up coats alternating low index and high index, obtain very high reflectances, the order of 90% for a particular wavelength. For example, using a coating consisting of eight layers alternating low index and high index it has been possible to produce a glass article having a reflectance of over 90% at a wavelength of 500 millimicrons. The actual location of the maximum will depend upon two factors, the physical thickness of each coat and within limits the index of refraction of each coat, the controlling factor being the optical thickness which is the thickness divided by the index of refraction of the resulting layer. For example, to form such a high reflecting article a solution is prepared consisting of:

| | Parts by weight |
|---|---|
| Ethyl alcohol | 86.5 |
| Tetraethylorthosilicate | 8.5 |
| Hydrochloric acid | 5 |

This solution is used for producing relatively low index coatings referred to herein as solution 50I.

A second solution is prepared consisting of:

| | Parts by weight |
|---|---|
| Alcohol | 92 |
| Titanium tetra chloride | 8 |

This solution is used for producing relatively high index coatings and is referred to herein as solution #155M.

It is understood that in both cases other water miscible volatile solvents in which the various ingredients are soluble and which are water miscible may be used.

A method of procedure for producing an article having very high reflecting characteristics is as follows:

The article is placed in a chuck and rotated in a horizontal plane as shown in Figs. 3 and 4 and rotated at a controlled speed. An article two inches in diameter would be rotated at 1800 R. P. M. While the article is rotating a few drops of solution #50I are applied at the center of the article, in this case a flat disc, and the spinning continued until the solvents have evaporated. The article is then removed and baked at a temperature of approximately 100 to several hundred degrees centigrade for a time interval sufficient to render the coating insoluble.

After cooling the process is repeated using solution #155M. Again the coating is baked under the same conditions as for the first coat. This results in an article having high reflectance. The reflecting characteristics may be increased by a repetition of these two coating procedures, it being preferred that in every case the outer surface be of the high index and several of such coatings may be built up in an article.

Other methods of applying these coatings may be used. For example, the coatings may be applied to the article by dipping and withdrawing or by spraying, or by dipping and rotating before the solvents have evaporated and in general the same procedure is followed as for producing low reflecting coatings as set forth above.

By the application of a multiplicity of alternating layers of low and high index, it is possible to obtain highly selective efficient filters whereby the transmission of light for a particular wavelength is greater than that for adjacent wavelengths which are reflected to a greater degree than the wavelengths transmitted. The color of the light transmitted and the color of the light reflected by such a composite structure can be varied by varying the relative thickness of the various layers and by controlling the number of layers applied. In each instance, however, the coatings will be applied alternately.

These highly reflective coatings whether of the single layer type such as referred to above as being obtained by the use of #155 solution alone as applied to an article for increasing the reflectivity and also in the multicoat articles, have the property of transmitting almost completely the light which is not reflected so that the transmitted light is substantially equal to the original amount of light minus the reflected light. In other words, the transmitted light is equal to one minus the reflected light.

By the proper selection of thickness and number of coatings, the resulting reflection can be made very high for one color of the spectrum and the transmission very high for another color of the spectrum. For instance, by proper choice of thickness and number of superimposed layers it is possible to get more than 90% reflection at a wavelength of 500 millimicrons and less than 20% reflection at 650 millimicrons and likewise in the extreme blue at a wavelength of 400 millimicrons reflection will be less than 20%. The transmission is almost 100% minus reflection, that is, there is practically no loss within the films. These data, however, are given as illustrative of one thickness. The reflectance can be shifted, for instance, so that there will be at 400 to 450 millimicrons a reflection of 90% and at 550 millimicrons a reflection of less than 20% and a correspondingly high transmission of above 80%. Films of this type can be used where it is desired to split beams of light with high efficiency into the different colored components as in three color process work. Of course, the exact placing of the maximum reflection would depend upon the filter and process used in the three color work and the two reflecting films mentioned numerically are only mentioned as examples of what can be done. In the present beam splitters, using semi-transparent metallic mirrors, there is great loss of light due to absorption in the mirror and due to the fact that all colors are reflected equally by the metallic mirrors. In the present instance the majority of the light reflected is that which is desired on that image and the rest is transmitted so there is very little light lost and the depth of color filter used directly in front of the film can be reduced giving an estimated several times the speed for the camera over what is presently available. The exact figures will vary with conditions but should, in general, be a factor of three roughly.

The coatings are applied in the same manner as set forth above.

The usual procedure in three color separation negatives in color photography is to use two very thin semi-transparent films coated with a very thin layer of aluminum, silver, platinum, etc. as reflectors. These mirrors reflect a part of the light and transmit a part of the light in the spectrum but they have a very high absorption factor so that a film reflecting 20% would not transmit the other 80% but very much less perhaps about 50%. By substituting films of the present invention for the metallic films almost all of the light not reflected is transmitted, the loss amounting to a percent or two being almost too small to be definitely measured. In fact some measurements have shown substantially no loss.

We have mentioned only color photography in this example. There are many other applications besides color photography where it is desired to separate the light into different colored components and the invention will apply equally as well to these other uses.

In general the most useful results have been obtained by the use of layers having an optical thickness of roughly ¼ wavelength of visible light, but it is to be understood that for certain specific purposes such as the production of articles reflecting to a high degree in the ultra-violet or in the infra-red coatings of greater or less thickness may be used. In general for greater reflectance in the infra-red region of the spectrum the coatings would be greater than for those for visible light having a thickness of roughly ¼ the wavelength which it is desired to reflect most strongly. It is to be understood that the thickness control set forth above also refers to articles that are to be low reflecting and formed as set forth above. Because of the speed and simplicity of this process, it is easier to determine the best thickness experimentally instead of solving the difficult vector equations for multiple reflections inside the layers. After the correct thicknesses have been determined by varying the concentrations and the speed of rotation or withdrawal from the solution, control of these factors allows the duplication of results.

It has been found that articles coated with these high reflecting coatings such as coating No. 155F. strongly polarize the light reflected from such surfaces at the polarizing angle. In addition it has been observed that the light transmitted is also strongly polarized when it has traversed the coating at the polarizing angle. Such coated transparent articles differ from similar uncoated articles in that the degree of polarization of this transmitted light is much greater being substantially complete for a coated article having upon its surface a multicoat layer comprising a low index layer adjacent the article and a high index layer on the outside. One of such articles viewed at an angle may serve as an analyzer for naturally polarized light such as that reflected from materials capable of polarizing light by reflection or two such articles supported in proper angular relationship may serve as a polarizing combination with the extent of transmitted light depending upon the angles.

As described above, other high index solution produced coatings may be used. For example, it has been found that tin oxide coatings, tungsten oxide coatings, or other similarly produced oxide coatings may be used. In general, however, the high index layer or coating is desired to have as high an index as possible as compared with the index of the low index coating or the index of the articles. When a single high index coating is used on the article, the said coating must be of higher index than the index of said article.

While maximum reflectance have been obtained where the layers adjacent the glass was of relatively low index, it is, of course, to be understood that conditions may arise in which it is desirable that the layers adjacent to the glass in a multi-coating structure should preferably be of relatively high index as a structure of this nature gives an additional control of the spectrally selective reflectance and transmissions.

While reference has chiefly been made to such high reflected coatings for transparent articles, it is to be understood that such coatings may be combined with or applied to articles which are themselves selectively transparent such as color filters and the like whereby the spectral nature of the transmitted light may be varied or controlled. Similarly highly reflecting coatings of the nature described may be applied to opaque articles whereby the reflecting characteristics may be modified.

Is is, of course, to be understood that solution-deposited coatings of the nature described may be applied to or used in conjunction with coatings applied by other known means. For example, the low index layer adjacent to the glass may be produced by vacuum deposition of magnesium fluoride or other coating producing materials or the low index coating adjacent the glass may be produced by etching or leaching the glass surface in which instance a high index coating of the nature set forth herein would be applied or a multiplicity of coatings according to the present invention could be applied thereto or all of the low index coatings could be produced by vacuum deposition.

Incorporation of removable constituents soluble in the solution used for producing the low index coatings and the subsequent removal of such removable constituents will result in still lower index coatings. This can be accomplished by incorporating in the solution #50–I one or two per cent of a soluble constituent such as magnesium chloride. After the coating has been hardened by baking or other means, treatment with water or other solvents to remove the removable constituent or constituents will result in a coating having a lower index of refraction than when the regular #50–I solution is used. Under these conditions the reflective characteristics of the article when a subsequent coating of the high index type is applied will be modified.

As shown in Table I and in Table II means are described for raising the index of the low index layer and lowering the index of the high index layer. These methods give an additional control of the refractive indices and thickness of the various layers or coatings. It is to be understood that any of the solutions set forth herein may be employed in producing coatings according to the invention.

It is to be understood that one of the coatings of the multiple coated articles may be solution-deposited and another of said coatings vacuum deposited. These statements apply to articles having low reflection characteristics as well as articles having high reflection characteristics, the method employed being selected according to the size and feasibility of forming such coatings.

Because of the highly selective nature of the reflection characteristics of articles having the highly reflected coatings described herein, it is possible to construct devices for rendering light highly monochromatic by a series of selected reflections. Because of the high reflectivity that can be obtained in desired regions of the spectrum as set forth above a multiplicity of reflections from mirror surfaces having such characteristics results in the very efficient production of light of a desired wavelength using as a light source an illuminant having a continuous spectrum such as an incandescent lamp. Such a structure would be very useful in spectroscopy and spectroscopic devices.

Combinations of such selectively reflective coated articles may be used in conjunction with filters, if desired, in order to permit a more compact and simple construction than existing filters. For example, a light source in conjunction with a mirror, which may be concave, coated on its reflective surface with a selectively highly reflecting surface of the nature described may be used in conjunction with a slightly colored filter to produce a highly monochromatic intense beam because the slightly colored filter serves only to remove the small amount of non-monochromatic light reflected at the said highly reflected surface.

Highly selective filters may also be made by taking advantage of the selectively high transmission of such highly reflective surfaces whereby the spectral nature of the transmitted light not reflected by the selective highly reflective layer is corrected by the filter or the inadequacies of the filter are corrected by the spectral nature of the transmitted light.

It is to be understood that the light referred to throughout need not necessarily be in the visible region of the spectrum but may be in the ultra-violet or infra-red.

From the foregoing description, it is apparent therefore that simple, efficient, and economical methods have been provided for accomplishing all of the objects of the invention.

Having described our invention, we claim:

1. An article having a light modifying layer thereon, said article comprising a substrate of a given index of refraction greater than 1.0 having inherently a light reflecting surface thereon and a reflection modifying layer on said surface, said layer consisting of a thin, smooth, transparent, solid, firmly adherent homogeneous, intimate, unitary mixture of silicon dioxide and an oxide of the group consisting of tin oxide, tungsten oxide and titanium oxide, having a uniform index of refraction, the oxide selected from said group having an index of refraction greater than that of the substrate and the silicon dioxide having an index of refraction less than that of the substrate, the relative proportions of the silicon dioxide and the oxide of said group in said mixture being such that the index of refraction of said layer is different from the index of refraction of the substrate, the index of refraction of the layer being intermediate that of the silicon dioxide and the oxide of said group, with said layer having an optical thickness approximately ¼ wave-length of that of the incident light.

2. An article having a light modifying coating thereon, said article comprising a substrate of a given index of refraction greater than 1.0 having inherently a light reflecting surface thereon and a reflection modifying coating on said surface consisting of a pair of superimposed solid transparent layers, one of said layers consisting of a thin, smooth, transparent, solid, firmly adherent homogeneous, intimate, unitary mixture of silicon dioxide and an oxide of the group consisting of tin oxide, tungsten oxide and titanium oxide, having a uniform index of refraction, the oxide selected from said group having an index of refraction greater than that of the substrate and the silicon dioxide having an index of refraction less than that of the substrate, the relative proportions of the silicon dioxide and the oxide of said group in said mixture being such that the index of refraction of said layer is higher than the index of refraction of the substrate, the index of refraction of the layer being intermediate that of the silicon dioxide and the oxide of said group, and the other of said layers consisting substantially of pure silicon dioxide, said layer having an index of refraction less than the substrate and with said layers each having an optical thickness approximately ¼ wave-length of that of the incident light.

3. An article having a light modifying coating thereon, said article comprising a substrate of a given index of refraction greater than 1.0 having inherently a light reflecting surface thereon and a reflection modifying coating on said surface consisting of a pair of superimposed solid transparent layers, each having an optical thickness of approximately a quarter wave length of the incident light, one of said layers consisting of a thin, smooth, transparent, solid, firmly adherent homogeneous, intimate, unitary mixture of silicon dioxide and an oxide of the group consisting of tin oxide, tungsten oxide and titanium oxide, having a uniform index of refraction, the oxide selected from said group having an index of refraction greater than that of the substrate and the silicon dioxide having an index of refraction less than that of the substrate, the relative proportions of the silicon dioxide and the oxide of said group in said mixture being such that the index of refraction of said layer is lower than the index of refraction of the substrate, the index of refraction of said layer being intermediate that of the silicon dioxide and the oxide of said group, and the other of said layers consisting substantially of an oxide of said group consisting of tin oxide, tungsten oxide and titanium oxide.

4. An article having a light modifying layer thereon, said article comprising a substrate of a given index of refraction greater than 1.0 having inherently a light reflecting surface thereon and a reflection modifying coating on said surface, said coating consisting of a plurality of superimposed transparent layers, each having an optical thickness approximately a ¼ wave length of that of the incident light and alternately having indices of refraction higher and lower than that of the substrate, said layers having an index of refraction lower than that of the substrate consisting of a thin, smooth, transparent solid, firmly adherent homogeneous, intimate, unitary mixture of silicon dioxide and an oxide of the group consisting of tin oxide, tungsten oxide and titanium oxide, having a uniform index of refraction, the oxide selected from said group having an index of refraction greater than that of the substrate and the silicon dioxide having an index of refraction less than that of the substrate, the relative proportions of the silicon dioxide and the oxide of said group in said mixture being such that the index of refraction of said layer is lower than the index of refraction of the substrate, the index of refraction of the layer being intermediate that of the silicon dioxide and the oxide of said group.

5. An article having a light modifying layer thereon, said article comprising a substrate of a given index of refraction greater than 1.0 having inherently a light reflecting surface thereon and a reflection modifying coating on said surface, said coating consisting of a plurality of superimposed transparent layers, each having an optical thickness approximately a ¼ wave length of that of the incident light and alternately having indices of refraction higher and lower than that of the substrate, said layers having an index of refraction higher than that of the substrate consisting of a thin, smooth, transparent, solid, firmly adherent, homogeneous, intimate, unitary mixture of silicon dioxide and an oxide of the group consisting of tin oxide, tungsten oxide and titanium oxide, having a uniform index of refraction, the oxide selected from said group having an index of refraction greater than that of the substrate and the silicon dioxide having an index of refraction less than that of the substrate, the relative proportions of the silicon dioxide and the oxide of said group in said mixture being such that the index of refraction of said layer is higher than the index of refraction of the substrate, the index of refraction of the layer being intermediate that of the silicon dioxide and the oxide of said group.

6. An article having a light modifying film thereon, said article comprising a substrate of a given index of refraction greater than one having inherently a light reflecting surface thereon, and a reflection modifying film of a homogeneous mixture of titanium oxide and silicon dioxide on said surface, said film consisting of a thin, smooth, homogeneous, transparent, solid, firmly-adherent coherent product of the evaporation in situ of a liquid solution of titanium tetrachloride, alkyl silicate ester and volatile organic water miscible solvent, said film having a uniform index of refraction and said index of refraction of the film being between that of the titanium oxide and the silicon dioxide, said index being different from that of the substrate, and said film having an optical thickness approximately that of one-quarter wavelength of the incident light.

7. An article having a light modifying coating thereon, said article comprising a substrate of a given index of refraction greater than one having inherently a light reflecting surface thereon, and a reflection modifying coating on said surface embodying a pair of superimposed transparent layers, each having an optical thickness approximately that of one-quarter wavelength of the incident light, one of said layers consisting of a homogeneous mixture of titanium oxide and silicon dioxide, said layer consisting of a thin, smooth, homogeneous, transparent, solid, firmly-adherent coherent product of the evaporation in situ of a liquid solution of titanium tetrachloride, alkyl silicate ester and volatile organic water miscible solvent, said layer having a uniform index of refraction and said index of refraction of the layer being between that of the titanium oxide and the silicon dioxide, said index being greater than that of the substrate, and the other of said layers consisting substantially of pure silicon dioxide, said layer having an index of refraction less than that of the substrate.

8. An article having a light modifying coating thereon, said article comprising a substrate of a given index of refraction greater than one having inherently a light reflecting surface thereon, and a reflection modifying coating on said surface embodying a plurality of superimposed transparent layers, each having an optical thickness equal to a ¼ wave length of the incident light, said layers alternately consisting of a film of substantially pure titanium oxide having an index of refraction greater than that of the substrate and a film of a homogeneous mixture of titanium oxide and silicon dioxide, said latter film consisting of a thin, smooth, homogeneous, transparent, solid, firmly-adherent coherent product of the evaporation in situ of a liquid solution of titanium tetrachloride, alkyl silicate ester and volatile organic water miscible solvent, said film having a uniform index of refraction, with said index of refraction of the film being between that of the titanium oxide and the silicon dioxide, and said index being less than that of the substrate.

9. The method of producing a light reflection modifying coating on an article having normally a light reflecting surface thereon comprising applying a liquid to said surface, said liquid containing from approximately 1 to 10% by weight of a decomposable titanium halide compound selected from the group consisting of titanium tetra-chloride, titanium tetra-bromide and titanium tetra-iodide, the balance of the liquid consisting substantially of a volatile water-miscible organic solvent selected from the group consisting of methyl alcohol, ethyl alcohol, isopropyl alcohol, butyl alcohol, the mono methyl ether of ethylene glycol, the mono ethyl ether of ethylene glycol, and mixtures thereof, said titanium halide compound being held in solution in the solvent in a substantially undecomposed state until the concentration of the titanium halide compound in the solvent is increased by evaporation of the solvent, and causing said liquid to form a uniform layer of a thickness which will contain the amount of the titanium halide compound required to produce on decomposition on said surface a substantially pure titanium oxide layer of a fraction of a wave length of light in thickness, evaporating said solvent from the liquid layer to increase the concentration of the titanium halide compound in the remaining solvent so as to bring about a decomposition of the titanium halide compound, and continuing said evaporation until a hard, smooth, durable, transparent, adherent light reflection modifying dry coating of substantially pure titanium oxide having a thickness of a fraction of wave length of light remains on said surface.

10. The method of producing a light reflection modifying coating on an article of a given index of refraction having normally a light reflecting surface thereon comprising applying a liquid to said surface, said liquid containing from a fraction of 1% to approximately 10% by weight of a decomposable titanium halide compound selected from the group consisting of titanium tetra-chloride, titanium tetra-bromide and titanium tetra-iodide, from a fraction of 1% to approximately 10% of a decomposable lower alkyl silicate, with the combined amounts of the titanium tetra-halide compound and lower alkyl silicate embodying from about 1% to 10% of the liquid, an amount of mineral acid exclusive of hydrofluoric acid equal to from 1.0 to 0.1 times the amount of lower alkyl silicate present in the liquid, and the balance of the liquid consisting substantially of a volatile water-miscible organic solvent selected from the group consisting of methyl alcohol, ethyl alcohol, isopropyl alcohol, butyl alcohol, the mono methyl ether of ethylene glycol, the mono ethyl ether of ethylene glycol, and mixtures thereof, said titanium halide compound and lower alkyl silicate being held in solution in the solvent in a substantially undecomposed state until the concentration of the said titanium halide compound and lower alkyl silicate in the solvent is increased by evaporation of the solvent, and causing said liquid to form a uniform layer of a thickness which will contain the amount of the mixture of titanium halide compound and lower alkyl silicate required to produce on decomposition a homogeneous intimate mixture of titanium oxide and silicon dioxide to a layer thickness of a fraction of a wave length of light, evaporating said solvent from the liquid layer to increase the concentration of the mixture of titanium halide compound and lower alkyl silicate in the remaining solvent so as to bring about a decomposition of the mixture of titanium halide compound and lower alkyl silicate, and continuing said evaporation until a hard, smooth, durable, transparent, adherent light reflection modifying dry coating of a homogeneous intimate mixture of titanium oxide and silicon dioxide having a thickness of a fraction of a wave length of light remains on said surface.

11. The method of producing a light reflection modifying coating on an article of a given index of refraction normally having a surface thereon which will reflect light, said coating consisting of a plurality of alternately arranged layers of material having a higher index and material having a lower index of refraction than the article, comprising the step of applying a substantially uniform deposit of silicon dioxide and so controlling said deposit as to produce an optical thickness of a fraction of a wave length of the incident light when forming a layer of the lower index of refraction, and the step of applying a liquid containing from approximately 1 to 10% of a decomposable titanium halide compound selected from the group consisting of titanium tetra-chloride, titanium tetra-bromide and titanium tetra-iodide, the balance of the liquid consisting substantially of a volatile water-miscible organic solvent selected from the group consisting of methyl alcohol, ethyl alcohol, isopropyl alcohol, butyl alcohol, the mono methyl ether of ethylene glycol, the mono ethyl ether of ethylene glycol, and mixtures thereof, said titanium halide compound being held in solution in the solvent in a substantially undecomposed state until the concentration of the titanium halide compound in the solvent is increased by evaporation of the solvent, when forming a layer of the material of higher index of refraction, and causing said liquid to form a uniform layer of a thickness which will contain the amount of the titanium halide compound required to produce on decomposition a substantially pure titanium oxide layer of a fraction of a wave length of light in thickness, evaporating said solvent from the liquid layer to increase the concentration of the titanium halide compound in the remaining solvent so as to bring about a decomposition of the titanium halide compound, and continuing said evaporation until a hard, smooth, durable, transparent, adherent light reflection modifying dry coating of substantially pure titanium oxide having a thickness of a fraction of a wave length of light remains, and simultaneously controlling the number and sequence of said layers according to the amount of surface reflection modification desired.

12. The method of producing a light reflection modifying coating on an article of a given index of refraction normally having a surface thereon which will reflect light, said coating consisting of a plurality of alternately arranged layers of material having a higher index and material having a lower index of refraction than the article, comprising the step of applying a substantially uniform deposit of titanium oxide and so controlling said deposit as to produce an optical thickness of a fraction of a wave length of the incident light when forming a layer of the higher index of refraction, and the step of applying a liquid containing from a fraction of 1% to approximately 10% by weight of a decomposable titanium halide compound selected from the group consisting of titanium tetra-chloride, titanium tetra-bromide and titanium tetra-iodide, from a fraction of 1% to approximately 10% of a decomposable lower alkyl silicate, with the combined amounts of the titanium tetra-halide compound and lower alkyl silicate embodying from about 1% to 10% of the liquid, and with the relative proportions thereof being controlled according to the index of refraction desired for the resultant homogeneous mixture layer, an amount of mineral acid exclusive of hydrofluoric acid equal to from 1.0 to 0.1 times the amount of lower alkyl silicate present in the liquid, and the balance of the liquid consisting substantially of a volatile water-miscible organic solvent selected from the group consisting of methyl alcohol, ethyl alcohol, isopropyl alcohol, butyl alcohol, the mono methyl ether of ethylene glycol, the mono ethyl ether of ethylene glycol, and mixtures thereof, said titanium halide compound and lower alkyl silicate being held in solution in the solvent in a substantially undecomposed state until the concentration of the said titanium halide compound and lower alkyl silicate in the solvent is increased by evaporation of the solvent, when forming a layer of the material of lower index, and causing said liquid to form a uniform layer of a thickness which will contain the amount of the mixture of titanium halide compound and lower alkyl silicate required to produce on decomposition a homogeneous intimate mixture of titanium oxide and silicon dioxide to a layer thickness of a fraction of a wave length of light, and of the desired index of refraction, evaporating said solvent from the liquid layer to increase the concentration of the mixture of titanium halide compound and lower alkyl silicate in the remaining solvent so as to bring about a decomposition of the mixture of titanium halide compound and lower alkyl silicate, and continuing said evaporation until a hard, smooth, durable, transparent, adherent light reflection modifying dry coating of a homogeneous intimate mixture of titanium oxide and silicon dioxide of the desired index of refraction having a thickness of a fraction of a wave length of light remains, and simultaneously controlling the number and sequence of said layers according to the amount of surface modification desired.

13. The method of producing a light reflection modifying coating on an article of a given index of refraction normally having a surface thereon which will reflect light, said coating consisting of a plurality of alternately arranged layers of material having a higher index and material having a lower index of refraction than the article, comprising the step of applying a substantially uniform deposit of silicon dioxide and so controlling said deposit as to produce an optical thickness of a fraction of a wave length of the incident light when forming a layer of the lower index of refraction, and the step of applying a liquid containing from a fraction of 1% to approximately 10% by weight of a decomposable titanium halide compound selected from the group consisting of titanium tetra-chloride, titanium tetra-bromide and titanium tetra-iodide, from a fraction of 1% to approximately 10% of a decomposable lower alkyl silicate with the combined amounts of the titanium tetra-halide compound and lower alkyl silicate embodying from about 1% to 10% of the liquid, and with the relative proportions thereof being controlled according to the index of refraction desired for the resultant homogeneous mixture layer, an amount of mineral acid exclusive of hydrofluoric acid equal to from 1.0 to 0.1 times the amount of lower alkyl silicate present in the liquid, and the balance of the liquid consisting substantially of a volatile water-miscible organic solvent selected from the group consisting of methyl alcohol, ethyl alcohol, isopropyl alcohol, butyl alcohol, the mono methyl ether of ethylene glycol, the mono ethyl ether of ethylene glycol, and mixtures thereof, said titanium halide compound and lower alkyl silicate being held in solution in the solvent in a substantially undecomposed state until the concentration of the said titanium halide compound and lower alkyl silicate in the solvent is increased by evaporation of the solvent, when forming a layer of the material of higher index of refraction, and causing said liquid to form a uniform layer of a thickness which will contain the amount of the mixture of titanium halide compound and lower alkyl silicate required to produce on decomposition a homogeneous intimate mixture of titanium oxide and silicon dioxide to a layer thickness of a fraction of a wave length of light, and of the desired index of refraction, evaporating said solvent from the liquid layer to increase the concentration of the mixture of titanium halide compound and lower alkyl silicate in the remaining solvent so as to bring about a decomposition of the mixture of titanium halide compound and lower alkyl silicate, and continuing said evaporation until a hard, smooth, durable, transparent, adherent light reflection modifying dry coating of a homogeneous intimate mixture of titanium oxide and silicon dioxide of the desired index of refraction having a thickness of a fraction of a wave length of light remains, and simultaneously controlling the number and sequence of said layers according to the amount of surface modification desired.

HAROLD R. MOULTON.
EDGAR D. TILLYER.

REFERENCES CITED

The following references are of record in the file of this patent:

UNITED STATES PATENTS

| Number | Name | Date |
| --- | --- | --- |
| 1,809,755 | King et al. | June 9, 1931 |
| 2,113,380 | Nichols | Apr. 5, 1938 |
| 2,281,474 | Cartwright et al. | Apr. 28, 1942 |

(Other references on following page)

UNITED STATES PATENTS

| Number | Name | Date |
|---|---|---|
| 2,303,906 | Benford et al. | Dec. 1, 1942 |
| 2,329,632 | Marseden | Sept. 14, 1943 |
| 2,331,716 | Nadeau et al. | Oct. 12, 1943 |
| 2,347,733 | Christensen | May 2, 1944 |
| 2,356,553 | Weissenberg | Aug. 22, 1944 |
| 2,366,516 | Geffcken | Jan. 2, 1945 |
| 2,366,687 | Osterberg | Jan. 2, 1945 |
| 2,379,790 | Dimmick | July 3, 1945 |
| 2,403,685 | Sachtleben | July 9, 1946 |
| 2,403,731 | MacNeille | July 9, 1946 |

OTHER REFERENCES

Ser. No. 333,186, Geffcken (A. P. C.), pub. June 1, 1943.